United States Patent
Cross, Jr. et al.

(10) Patent No.: US 8,024,194 B2
(45) Date of Patent: Sep. 20, 2011

(54) DYNAMIC SWITCHING BETWEEN LOCAL AND REMOTE SPEECH RENDERING

(75) Inventors: Charles W. Cross, Jr., Wellington, FL (US); David Jaramillo, Lake Worth, FL (US); Gerald M. McCobb, Delray Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 326 days.

(21) Appl. No.: 11/007,830

(22) Filed: Dec. 8, 2004

(65) Prior Publication Data
US 2006/0122836 A1 Jun. 8, 2006

(51) Int. Cl.
G10L 21/00 (2006.01)
G10L 13/00 (2006.01)
G10L 15/00 (2006.01)
(52) U.S. Cl. ........ 704/270; 704/275; 704/258; 704/260; 704/231
(58) Field of Classification Search ............... 704/270.1, 704/270, 275, 231, 258, 260; 379/88.17; 709/310; 710/1, 36
See application file for complete search history.

(56) References Cited

U.S. PATENT DOCUMENTS

| | | | |
|---|---|---|---|
| 5,544,228 A | 8/1996 | Wagner et al. | |
| 5,594,789 A | 1/1997 | Seaholtz et al. | |
| 5,774,857 A | 6/1998 | Newlin | |
| 5,943,648 A | 8/1999 | Tel | |
| 5,956,683 A | 9/1999 | Jacobs et al. | |
| 5,960,399 A * | 9/1999 | Barclay et al. | 704/270.1 |
| 6,094,680 A | 7/2000 | Hokanson | |
| 6,098,041 A | 8/2000 | Matsumoto | |
| 6,119,087 A | 9/2000 | Kuhn et al. | |
| 6,173,250 B1 | 1/2001 | Jong | |
| 6,173,259 B1 | 1/2001 | Bijl et al. | |
| 6,195,641 B1 | 2/2001 | Loring et al. | |
| 6,282,268 B1 | 8/2001 | Hughes et al. | |
| 6,282,508 B1 | 8/2001 | Kimura et al. | |
| 6,327,568 B1 | 12/2001 | Joost | |
| 6,363,348 B1 | 3/2002 | Besling et al. | |
| 6,408,272 B1 * | 6/2002 | White et al. | 704/270.1 |
| 6,456,974 B1 | 9/2002 | Baker et al. | |

(Continued)

FOREIGN PATENT DOCUMENTS

EP 0450610 A2 10/1991
(Continued)

OTHER PUBLICATIONS

Patent Abstract of Japan, for publication No. 09-098221.
(Continued)

*Primary Examiner* — James S. Wozniak
*Assistant Examiner* — Jialong He
(74) *Attorney, Agent, or Firm* — Wolf, Greenfield & Sacks, P.C.

(57) ABSTRACT

A multimodal browser for rendering a multimodal document on an end system defining a host can include a visual browser component for rendering visual content, if any, of the multimodal document, and a voice browser component for rendering voice-based content, if any, of the multimodal document. The voice browser component can determine which of a plurality of speech processing configuration is used by the host in rendering the voice-based content. The determination can be based upon the resources of the host running the application. The determination also can be based upon a processing instruction contained in the application.

12 Claims, 6 Drawing Sheets

U.S. PATENT DOCUMENTS

| | | |
|---|---|---|
| 6,487,534 B1 * | 11/2002 | Thelen et al. ............... 704/270 |
| 6,594,628 B1 | 7/2003 | Jacobs et al. |
| 6,604,077 B2 | 8/2003 | Dragosh et al. |
| 6,615,171 B1 | 9/2003 | Kanevsky et al. |
| 6,738,743 B2 * | 5/2004 | Sharma et al. ............ 704/270.1 |
| 6,801,604 B2 * | 10/2004 | Maes et al. ................ 379/88.17 |
| 6,823,306 B2 * | 11/2004 | Reding et al. ............... 704/244 |
| 6,904,600 B1 * | 6/2005 | James et al. ................ 719/328 |
| 6,928,462 B2 * | 8/2005 | Jia ............................... 709/203 |
| 7,003,463 B1 | 2/2006 | Maes et al. |
| 7,003,464 B2 * | 2/2006 | Ferrans et al. ............ 704/270.1 |
| 7,058,580 B2 * | 6/2006 | Ueyama et al. ............ 704/270.1 |
| 7,062,444 B2 * | 6/2006 | He et al. ........................ 704/275 |
| 7,117,159 B1 * | 10/2006 | Packingham et al. ......... 704/275 |
| 7,133,829 B2 * | 11/2006 | Cyr et al. .................... 704/270.1 |
| 7,519,536 B2 | 4/2009 | Maes et al. |
| 2001/0032074 A1 | 10/2001 | Harris et al. |
| 2002/0091527 A1 * | 7/2002 | Shiau ......................... 704/270.1 |
| 2002/0097692 A1 | 7/2002 | Ruotoistenmaki |
| 2002/0194388 A1 * | 12/2002 | Boloker et al. ............... 709/310 |
| 2003/0078775 A1 | 4/2003 | Plude et al. |
| 2003/0088421 A1 * | 5/2003 | Maes et al. ................. 704/270.1 |
| 2004/0019487 A1 * | 1/2004 | Kleindienst et al. ....... 704/270.1 |
| 2004/0044522 A1 * | 3/2004 | Yang et al. ..................... 704/201 |
| 2004/0128129 A1 | 7/2004 | Sherman |
| 2004/0172257 A1 | 9/2004 | Liqin et al. |
| 2005/0131704 A1 | 6/2005 | Dragosh et al. |
| 2005/0138219 A1 * | 6/2005 | Bou-Ghannam et al. ......... 710/1 |

FOREIGN PATENT DOCUMENTS

| | | |
|---|---|---|
| EP | 0654930 A1 | 5/1995 |
| GB | 2325112 A | 11/1998 |
| JP | 09-098221 | 4/1997 |
| JP | 10-207683 | 8/1998 |
| JP | 10-214258 | 8/1998 |
| JP | 10-228431 | 8/1998 |
| WO | WO 97/47122 | 12/1997 |

OTHER PUBLICATIONS

Patent Abstract of Japan, for publication No. 10-207683.
Patent Abstract of Japan, for publication No. 10-214258.
Patent Abstract of Japan, for publication No. 10-228431.

* cited by examiner

DYNAMIC SWITCHING BETWEEN LOCAL AND REMOTE SPEECH RENDERING

BACKGROUND

1. Field of the Invention

The present invention is related to the field of communications networks, and, more particularly, to network browsers used in communications networks.

2. Description of the Related Art

It is expected that in the not too distant future personal computers and other small computing devices, such as smart phones and personal digital assistants (PDAs), will be able to run Web applications that are configured to support multimodal interactions. As is well known, a Web application, generally, is a software program that affects the delivery of data from a Web site to a client, the Web site serving as the front-end of the particular application, and client-supplied data inducing the logical operations by which the Web site transfers data or information to the client. A Web application configured to support multimodal interactions is typically referred to as a multimodal Web application.

With a multimodal application, a user can interact with the application through different modes, a particular mode characterizing the particular form of input and/or output related to the application. The different modes of user interaction with the application—including voice and visual modes—can be used interchangeably during the same interaction. Thus, with a multimodal Web application, the user is able to interact with the application using, for example, human speech as well as the more traditional a graphical user interface (GUI).

The form-factor of smart phones, PDAs, and other small computing devices makes data entry via a keypad relatively more difficult compared with the entry of data via human speech. Nonetheless, there are situations, such as when the device is being utilized in a noisy environment, in which it is helpful to interact via non-voice mode, such as with a keypad, stylus, and/or GUI. It is not surprising, therefore, that the option of interacting with an application via multiple modes interchangeably, as afforded by a multimodal Web application, makes the use of multimodal Web applications especially advantageous in the context of smart phones, PDAs, and other relatively small computing devices.

Nonetheless, the relatively small size of a such computing devices, however desirable in other respects, can make the local running of different modes of a multimodal Web application on such devices problematic. The relatively small size of a smart phone, PDA, or similar computing device can constrain the amount of processing and/or memory resources that can be accommodated in such a device. Accordingly, such resource-constrained devices are often incapable of supporting more than one mode of interaction running locally on the device itself. The rendering of data in the form of speech, for example, is a mode that requires processing resources exceeding those of many types of resource-constrained devices. Thus, in running a multimodal Web application on a small device, it may be that the visual mode can be successfully run locally on the device, yet it may be necessary to run the speech rendering component of the same application on a remote device, namely, the server distributing the application. Alternatively, a relatively rudimentary speech rendering component residing on the small device can provide basic speech recognition input, while a more robust, albeit remotely located, speech rendering component can be used to process more complex speech input.

In the present context, it is worth recalling that speech processing typically comprises two components: speech recognition and speech synthesis. The speech recognition encompasses automatically recognizing speech input by comparing speech segments to a grammar, or grammars. Speech synthesis encompasses text-to-speech (TTS) processing by which synthetic speech output is rendered based upon input in the form of text. Even though a complete voice-mode application typically requires both automatic speech recognition and TTS processing, each can be performed at different locations. In the specific context of a hand-held or other small device, the device may have sufficient resources to locally process TTS, but may not have sufficient resources to perform speech recognition locally.

Additionally, even though there may be devices that can process both TTS and speech recognition locally, a particular Web application may require that speech recognition be performed on the Web server. This latter situation may arise when the relatively greater resources of the Web server are needed to support a large grammar, or multiple grammars, as well as perform post-processing functions related to a natural language understanding (NLU) model.

Notwithstanding these different scenarios, conventional multimodal Web browsers lack a dynamic capacity for switching among alternate speech configurations depending on the resources of the particular host that is tasked with running the application and/or depending on the nature of the particular application itself. That is, conventional multimodal Web browsers lack a dynamic capacity to switch, for example, from a speech configuration in which the speech recognition and TTS processing are performed locally to one in which both are performed remotely at the server or in which the TTS processing is performed locally while speech recognition is performed remotely.

SUMMARY OF THE INVENTION

The present invention provides for a multimodal browser that can run different multimodal web applications by switching dynamically between different speech configurations. More particularly, the present invention provides a method, a network browser, and an apparatus that enable the dynamic switching between alternate speech rendering configurations based on the resources of the host on which the application is to run and/or aspects of the application itself. The alternate configurations among which such dynamic switching can occur include, for example, a local speech recognition and local TTS processing configuration; a remote speech recognition and local TTS configuration; and a remote speech recognition and remote TTS processing configuration.

A computer-based method of running an application distributed from a server to an end system defining a host, according to one embodiment, can include automatically selecting a speech processing configuration for rendering voice-based content of the application if the application includes voice-based content. The method also can include loading at least one speech rendering engine based upon the selected speech processing configuration. The method further can include rendering the voice-based content, if any, using the at least one speech rendering engine.

Another embodiment of the present invention is a multimodal browser for rendering a multimodal document on an end system defining a host. The multimodal browser can include a visual browser component for rendering visual content, if any, of the multimodal document. The multimodal browser additionally can include a voice browser component for rendering voice-based content, if any, of the multimodal document, the voice browser component determining which of a plurality of speech processing configuration is used by the host in rendering the voice-based content.

Yet another embodiment of the present invention is an apparatus comprising a computer-readable storage medium that contains computer instructions for use in running an application distributed from a server to an end system defining a host. The computer instructions can include a computer instruction for selecting a speech processing configuration for rendering voice-based content of the application if the application includes voice-based content. The computer instructions can further include a computer instruction for loading at least one speech rendering engine based upon the selected speech processing configuration. Additionally, the computer instructions can include a computer instruction for rendering the voice-based content, if any, using the at least one speech rendering engine.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention enables a computer-based browser to run an application by dynamically switching between local and remote speech processing depending on the speech processing resources of the particular end system, or host, running the application and/or dictates of the application itself. The application can be a Web application distributed by a Web server to a host such as a personal computer (PC), a smart phone, or similar device. More particularly, the Web application can be a multimodal Web application that supports multimodal interactions between the application and a user. With the multimodal Web application, a user can interact with the application via a visual mode as well as via a speech mode, the speech mode interaction encompassing two distinct components: speech recognition based on one or more grammars, and TTS processing whereby textual content is rendered as speech. As described below, dynamic switching between local and remote speech processing enables the browser to determine the location at which the speech recognition and TTS processing are performed based on certain factors enumerated herein.

Figure 1:
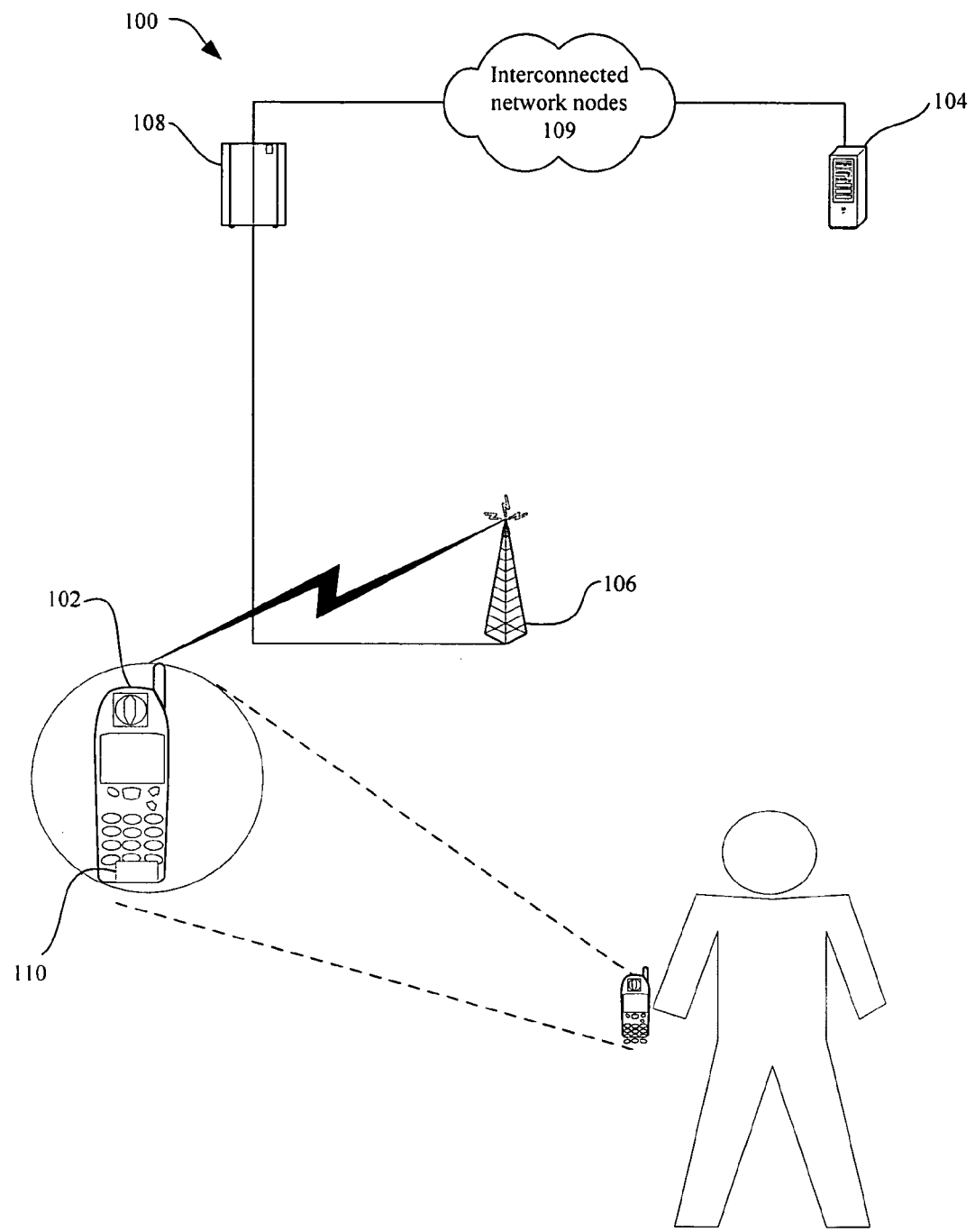
FIG. 1 is a schematic diagram of a communication network that includes an end system running an application according to one embodiment of the present invention.

FIG. 1 provides a schematic diagram of a network 100 that includes two distinct end systems, namely, a host 102 and a server 104, with the host running an application according to one embodiment of the present invention. The host 102 is illustratively a cell phone, but alternately, the host 102 can comprise various other communication and computing devices such as a PC, a PDA, or similar such device for interacting with another, remotely located device such as the server 104. The host 102 can include a display for rendering a GUI, as well as a keypad and/or a stylus for inputting data and/or selecting applications from a touch screen. The host 102 additionally can include processing circuitry, such as a microprocessor and associated memory, for processing and storing input and/or output in the form of speech. The server 104, more particularly, can be a Web server that distributes a Web application to the host 102.

Illustratively, the host 102 wirelessly communicates with the server 104 via RF signals conveyed to a radio tower 106 that is communicatively linked to a network node 108, such as a traffic switching device. The network node 108 illustratively connects with the server 104 through one or more intermediate nodes 109, but, alternatively, it can connect directly to the server. The network 100 is merely illustrative of the various interconnections that, as will be readily appreciated by one of ordinary skill in the art, can be employed for effecting communications between the host 102 and server 104. For example, the network can be an interconnection of networks, such as the Internet. Alternatively, the host 102 may communicate wirelessly or by landline with the server 104 directly. As will be apparent from the discussion herein, these and others of the various networking arrangements do not affect the running of the application in accordance with various embodiments of the present invention.

The speech processing resources and capabilities of the host 102 determine which speech processing functions, if any, are performed locally at the host and which, if any, are performed remotely at the server 104. More particularly, the resources of the host 102 dictate which speech processing configurations can be used for rendering voice content of the particular application distributed to the host by the server 104.

As discussed herein, there are nine possible speech processing configurations depending on whether speech recognition is performed locally at the host 102 and/or remotely at the server 104, and whether TTS processing is performed locally (i.e., on the host 102) and/or remotely (i.e., at the server 104). The possible speech processing configurations are: local speech recognition and local TTS processing performed at the host; local speech recognition and TTS processing performed remotely at the server; remote speech recognition and local TTS processing; local and remote speech recognition, but only remote TTS processing; local and remote speech recognition, but only local TTS processing; only local speech recognition, but local and remote TTS processing; only remote speech recognition, but local and remote TTS processing; both local and remote speech recognition, as well as local and remote TTS processing; and, lastly, remote speech recognition and remote TTS processing.

Of the nine enumerated speech processing configurations, the fact that speech recognition tends to be the more resource intensive than is TTS processing means that the most pertinent speech processing configurations usually will be local speech recognition and local TTS processing, local TTS processing, and remote TTS and remote ASR processing. Thus the following discussions emphasizes these particular speech processing configurations, but it should be borne in mind that the embodiments of the invention discussed herein pertain to the remaining configurations as well.

Illustratively, a multimodal browser 110 resides on the host 102 in order to run the application distributed to the host by the server 104. The application is illustratively a multimodal application that comprises a set of documents that specify the interactions between a user and the application, the interactions encompassing visual interactions via a GUI, for example, and voice interactions effected through speech processing.

Figure 2:
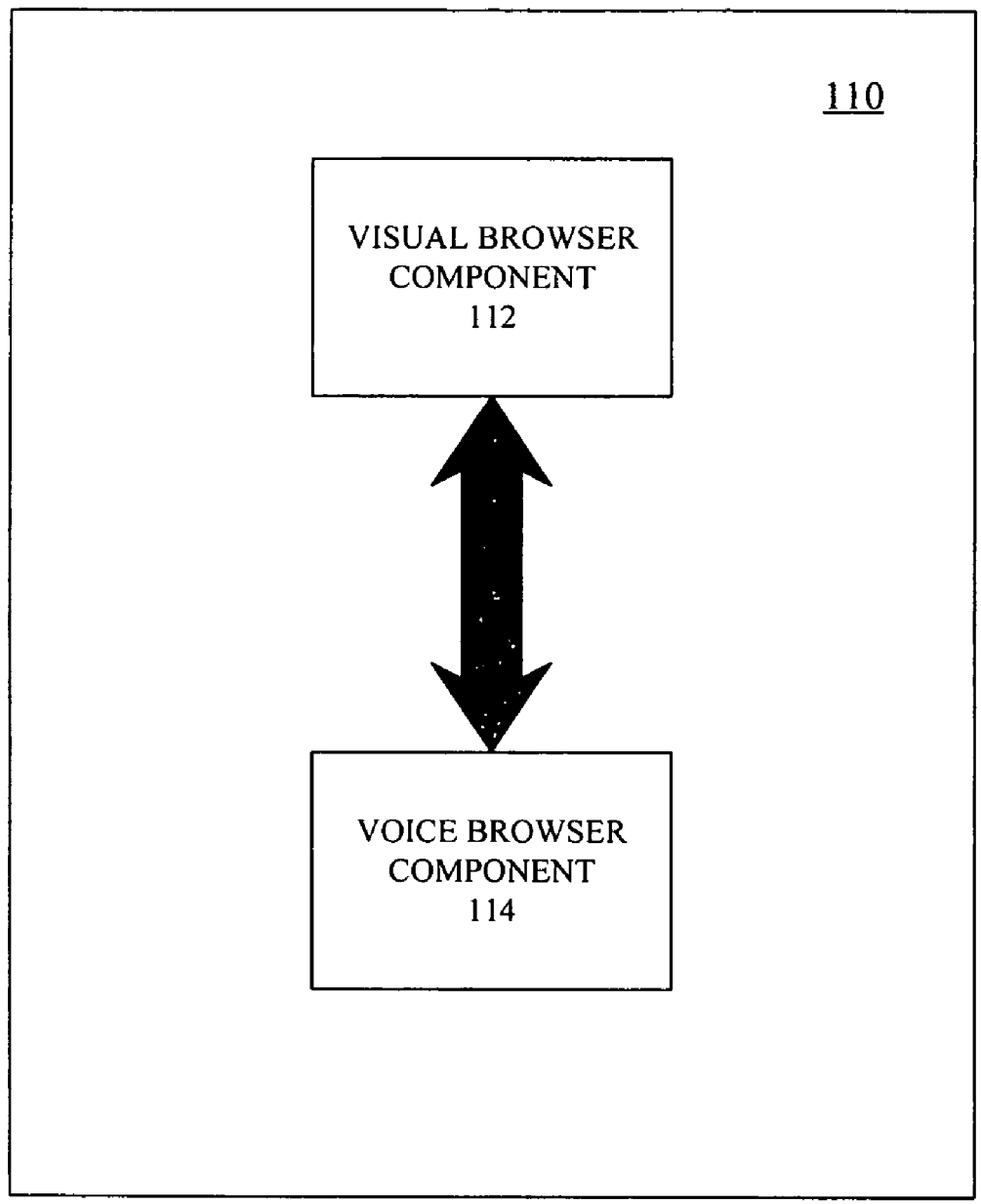
FIG. 2 is a schematic diagram of a multimodal browser residing on the host of FIG. 1.

Referring additionally to FIG. 2, the multimodal browser 110 illustratively includes a visual browser component 112 for rendering visual content of the multimodal document and a voice browser component 114 for rendering voice content of the multimodal document. The voice browser component 114, moreover, is configured to dynamically select from among the plurality of possible speech processing configurations which is used for rendering the voice content associated with the application. Based on the selection by the voice browser component 114, one or more speech engines is loaded at the host 102 and/or the server 104 to thereby render the voice content using a pair of engines, provided that the resources of the host support the selected speech processing configuration. Otherwise, the multimodal browser 110 provides an error indication, as detailed below. One of the pair of engines performs TTS processing, and the other performs speech recognition. The selection of the speech processing configuration is made on the basis on the type and extent of speech processing that the application requires as well as the particular resources of the host 102.

According to one embodiment, the application itself can indicate a speech processing configuration to be employed. For example, the application can be a Web application comprising one or more Web pages or documents. These documents, more particularly, can be written in an eXtensible markup language (XML), such as XHTM+Voice. The XML documents specify how the user interacts with the application distributed to the host 102 from the server 104, the interaction encompassing both a visual mode and voice mode interchangeably. The beginning of the document or Web page, moreover, can contain a processing instruction, which is read by the voice browser component 114 of the multimodal browser 110 and which indicates the particular speech processing configuration to be employed. The following is an exemplary XML processing instruction (PI) that can be contained at the beginning or top of a Web page:

<?xv-speech location="server"?>.

This exemplary XML PI specifies a location attribute, the location attribute indicating specifically that both speech recognition and TTS processing are to be performed on the server. Another value for the location attributes employed in XML documents, for example, is a "local" location attribute, which indicates that speech recognition is to be performed locally on the host. Still another value for the location attributes employed in XML documents is a "local-tts" location attribute, which indicates that TTS processing is only performed locally on the host. Other PIs contained in documents written in other languages can similarly be constructed for indicating a particular speech processing configuration, the particular speech processing configuration, in turn, indicating the respective locations at which the respective functions of speech recognition and TTS processing are to be performed.

According to another embodiment, the voice browser component 114 enables the location of speech rendering engines—either locally on the host 102 or else remotely on the server 104—based upon a speech location property stored within a configuration file. The configuration file can be stored on the host 102 by a host carrier or manufacturer, as will be readily appreciated by one of ordinary skill the art.

Figure 3:
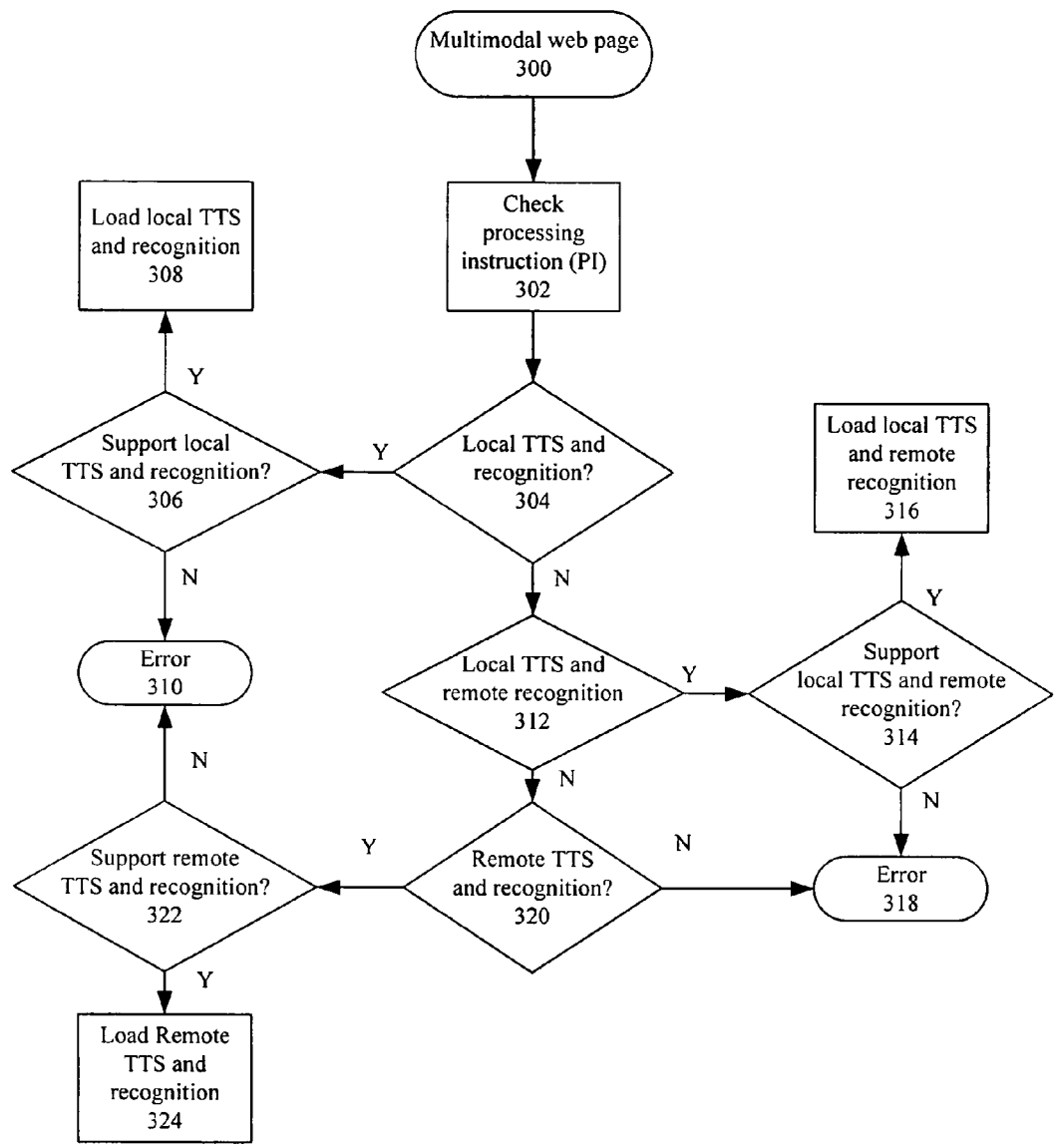
FIG. 3 is a flowchart illustrating operative features of a multimodal browser according to another embodiment of the present invention.

FIG. 3 illustrates various operative features of the voice browser component 114 in selecting from among the plurality of possible speech processing configurations. It is assumed for the sake of clarity that the plurality of speech processing configurations comprises only three configurations: local TTS processing as well as local speech recognition; local TTS processing and remote speech recognition; and, remote TTS processing as well as remote speech recognition.

Initially, at step 300, a document in the form of a Web page is received. At step 304, a determination is made as to whether the PI calls for local speech recognition and local TTS processing. If so, a subsequent determination at step 306 is made as to whether the resources of the host support both local TTS processing and local speech recognition. Assuming that the host resources support both, a local TTS engine and a local speech recognition engine are loaded at step 308. The speech content of the Web page is then rendered accordingly. Otherwise, if the resources of the host do not support both local speech recognition and local TTS processing, an error indication is generated at step 310.

Alternatively, if at step 304 it is determined that the PI does not call for both local speech recognition and local TTS processing, then a subsequent determination at step 312 is made as to whether the PI instead calls for local TTS processing and remote speech recognition. If so, then a subsequent determination at step 314 is made as to whether the resources of the host support this particular speech processing configuration. If the resources of the host do support local TTS processing and remote speech recognition, then the local TTS processing and remote speech recognition engines are loaded at step 316. If the resources do not support this speech processing configuration, a error indication is generated at step 318.

If at steps 304 and 312, respectively, it is determined that neither local TTS processing with local speech recognition nor local TTS processing with remote speech recognition are called for by the PI, then at step 320 a determination is made as to whether the PI instead calls for remote TTS processing as well as remote speech recognition. If so, then a subsequent determination at step 314 is made as to whether the resources of the host support this speech processing configuration. Depending on the determination, a remote TTS engine and as well as remote speech recognition engine are loaded at step 324, or else, returning to step 310, an error indication is generated.

The described sequence of operative actions can be repeated for different applications distributed to the host from the server. Accordingly, the various operative features of the voice browser component 114 provide a mechanism for dynamically switching between a plurality of different speech processing configurations for rendering voice-based content associated with different applications.

Figure 4:
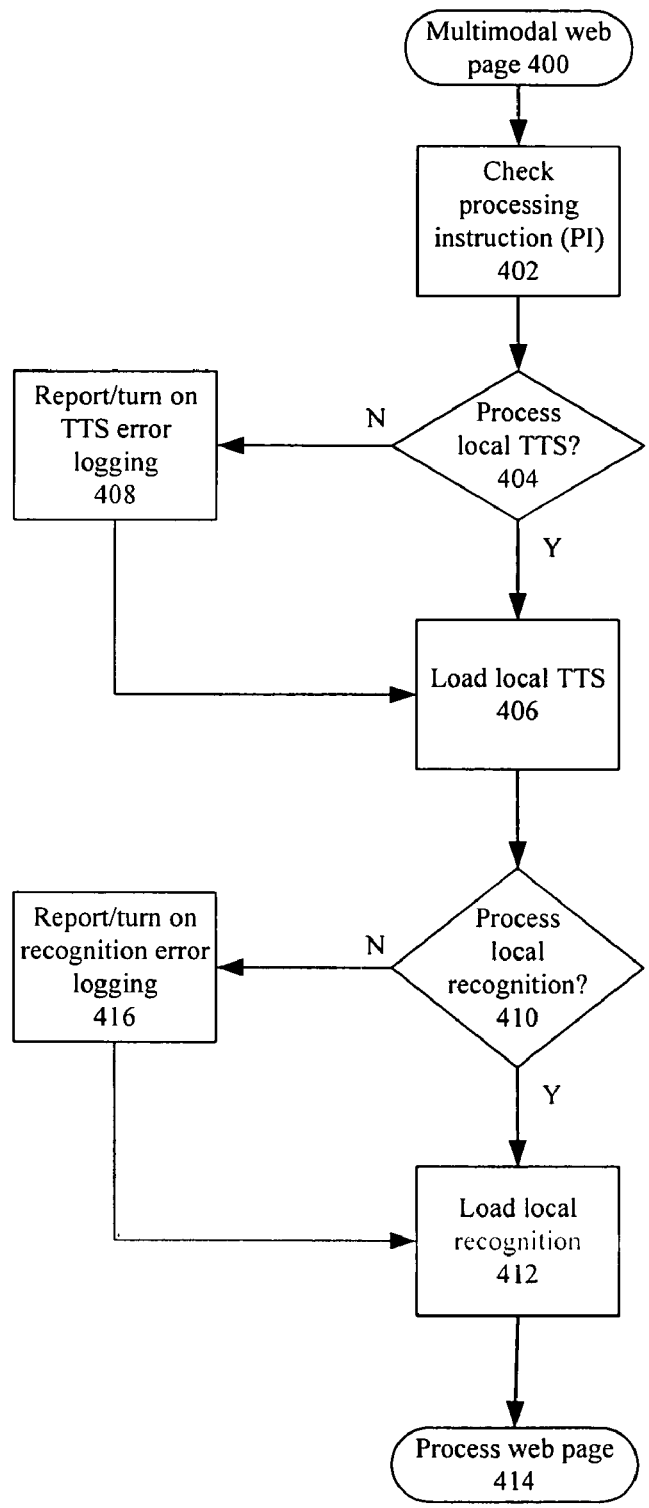
FIG. 4 is a flowchart illustrating operative features of a multimodal browser according to yet another embodiment of the present invention.

FIG. 4 illustrates these same operative features in the specific context a host having resources that support only local speech recognition and local TTS processing. At step 400, a Web page is again distributed to the host, and a PI contained in the Web page is read at step 402. If it is determined at step 404 that the PI calls for local TTS processing, then the local TTS engine is loaded at step 406. Otherwise, an error is reported and recorded in a TTS error log at step 408.

Next, at step 410, a determination is made as to whether the PI also calls for local speech recognition. If so, then the local speech recognition engine is loaded at step 412 and the speech content is rendered at step 414. If not, however, then an error is reported and recorded in a recognition error log at step 416.

Figure 5:
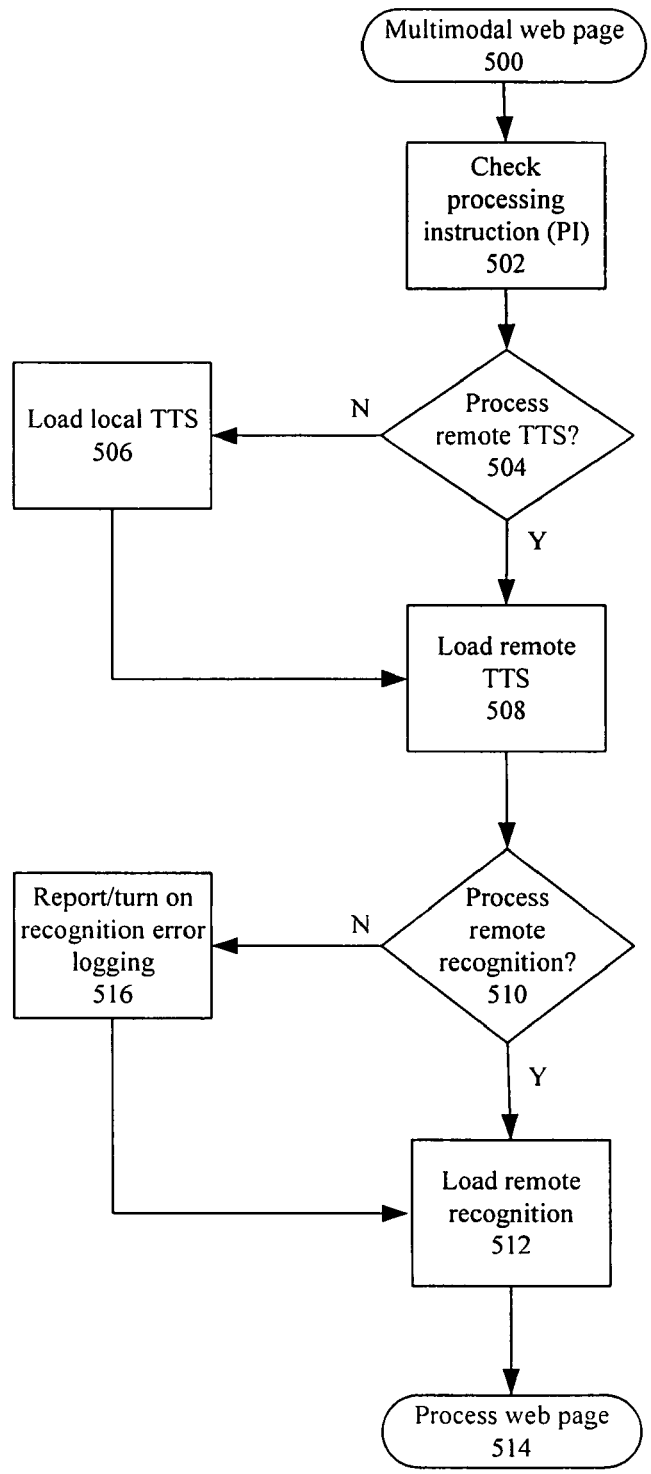
FIG. 5 is a flowchart illustrating operative features of a multimodal browser according to still another embodiment of the present invention.

FIG. 5 illustrates the operative aspects in the specific context of a host having resources to support local and remote TTS processing, but only remote speech recognition. A multimodal Web page is received at step 500 and the PI contained therein is read at step 502. It is determined at step 504 whether the PI calls for local or remote TTS processing. Depending on the determination, a local TTS engine is loaded at step 506 or a remote TTS engine is loaded at step 508.

Subsequently, it is determined at step 510 whether the PI contained in the Web page calls for local or remote speech recognition. If the later is called for by the PI, then the remote speech recognition engine is loaded at step 512, and the voice content is rendered at step 514. Otherwise, if local speech recognition is call for, then an error is reported and recorded in a recognition error log at step 516. This step follows since the host does not possess the resources needed to support local speech recognition when such is called for by a particular application.

Figure 6:
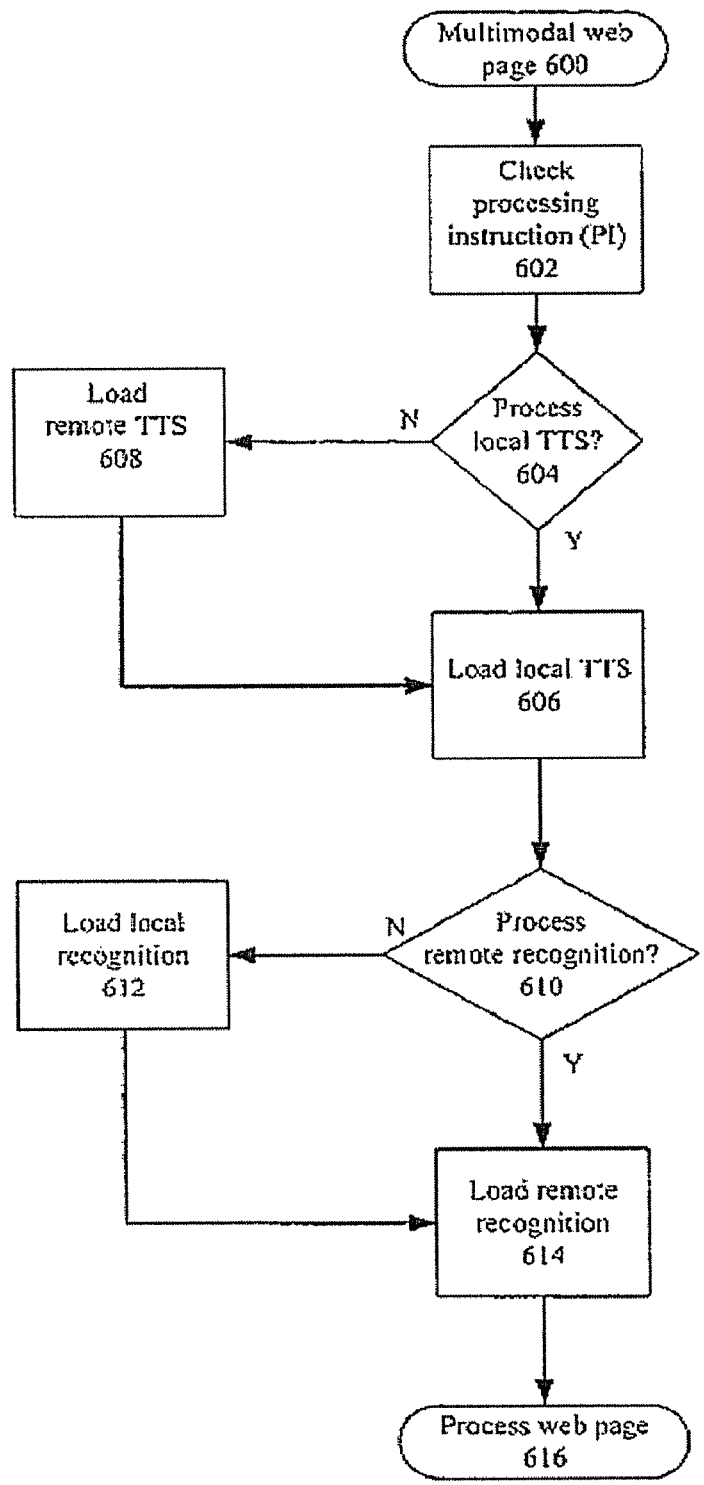
FIG. 6 is a flowchart illustrating operative features of a multimodal browser according to yet another embodiment of the present invention.

FIG. 6 illustrates the operative features in the specific context of a host having resources to support local and remote TTS processing as well as local and remote speech recognition. At steps 600 and 602, respectively, a Web page is received and a PI contained therein is read. At step 604 it is determined whether the PI calls for local or remote TTS processing. If the former is called for, then the local TTS engine is loaded at step 606. If the latter is called for, then the remote TTS engine is loaded at step 608.

Subsequently, at step 610, a determination is made as to whether local or remote speech recognition is called for by the PI contained in the Web page. Depending on the determination, a local speech recognition is loaded at step 612, or a remote speech recognition is loaded at step 614. At step 616, the voice content is rendered.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A computer-implemented method of running an application on a computing end device defining a host, the application being distributed from a server to the host, the method comprising:
    obtaining the application from the server;
    executing a multi-modal browser on the host to run the application, the application employing both text-to-speech (TTS) processing and automatic speech recognition (ASR) processing;
    analyzing, by the host, an instruction in the application that instructs the host to perform the TTS processing and/or ASR processing locally or remotely;
    determining, by the host, whether the host is capable of performing the TTS processing and/or ASR processing in accordance with the instruction, wherein:
        if the instruction instructs the host to perform the TTS processing and the ASR processing locally, determining, by the host, whether the host supports performing the TTS processing and the ASR processing locally, and
        if the instruction instructs the host to perform the TTS processing locally and the ASR processing remotely, determining, by the host, whether the host supports performing the TTS processing locally and the ASR processing remotely;
    if the host is capable of performing the TTS processing and/or ASR processing in accordance with the instruction, executing the application using the TTS processing and/or the ASR processing in accordance with the instruction; and
    generating an error indication if the host is not capable of performing the TTS processing and/or ASR processing in accordance with the instruction.

2. The method of claim 1, wherein the application comprises a Web-based application and the server comprises a Web server.

3. The method of claim 2, wherein the Web-based application comprises at least one multimodal Web page.

4. The method of claim 3, wherein the at least one multimodal Web page is an XML document that specifies how a user interacts with the host and the application using a graphical user interface (GUI) and/or speech.

5. A non-transitory computer readable storage medium encoded with a plurality of instructions that, when executed on at least one processor, perform a method of running an application on an end device defining a host, the application being distributed from a server to the host, the method comprising:
    obtaining the application from the server;
    executing a multi-modal browser on the host to run the application, the application employing both text-to-speech (TTS) processing and automatic speech recognition (ASR) processing;
    analyzing, by the host, an instruction in the application that instructs the host to perform the TTS processing and/or ASR processing locally or remotely;
    determining, by the host, whether the host is capable of performing the TTS processing and/or ASR processing in accordance with the instruction, wherein:
        if the instruction instructs the host to perform the TTS processing and the ASR processing locally, determining, by the host, whether the host supports performing the TTS processing and the ASR processing locally, and
        if the instruction instructs the host to perform the TTS processing locally and the ASR processing remotely, determining, by the host, whether the host supports performing the TTS processing locally and the ASR processing remotely;
    if the host is capable of performing the TTS processing and/or ASR processing in accordance with the instruction, executing the application using the TTS processing and/or the ASR processing in accordance with the instruction; and generating an error indication if the host is not capable of performing the TTS processing and/or ASR processing in accordance with the instruction.

6. The non-transitory computer readable storage medium of claim 5, wherein the application comprises a Web-based application and the server comprises a Web server.

7. The non-transitory computer readable storage medium of claim 6, wherein the Web-based application comprises at least one multimodal Web page.

8. The non-transitory computer readable storage medium of claim 7, wherein the at least one multimodal Web page is an XML document that specifies how a user interacts with the host and the application using a graphical user interface (GUI) and/or speech.

9. A host device for running an application that is distributed from a server to the host over at least one network, comprising:

communication means for communicating over the at least one network, the communication means capable of receiving the application over the at least one network; and at least one computer coupled to the communication means, the at least one computer programmed to:

execute a multi-modal browser on the host to run the application, the application employing both text-to-speech (TTS) processing and automatic speech recognition (ASR) processing;

analyze an instruction in the application that instructs the host to perform the TTS processing and/or ASR processing locally or remotely;

determine whether the host is capable of performing the TTS processing and/or ASR processing in accordance with the instruction, wherein:

if the instruction instructs the host to perform the TTS processing and the ASR processing locally, the host determines whether the host supports performing the TTS processing and the ASR processing locally, and if the instruction instructs the host to perform the TTS processing locally and the ASR processing remotely, the host determines whether the host supports performing the TTS processing locally and the ASR processing remotely;

if the host is capable of performing the TTS processing and/or ASR processing in accordance with the instruction, execute the application using the TTS processing and/or the ASR processing in accordance with the instruction; and generate an error indication if the host is not capable of performing the TTS processing and/or ASR processing in accordance with the instruction.

10. The host device claim 9, wherein the application comprises a Web-based application and the server comprises a Web server.

11. The host device of claim 10, wherein the Web-based application comprises at least one multimodal Web page.

12. The host device of claim 11, wherein the at least one multimodal Web page is an XML document that specifies how a user interacts with the host and the application using a graphical user interface (GUI) and/or speech.

* * * * *